United States Patent
Frese

[15] 3,678,023
[45] July 18, 1972

[54] PROCESS FOR THE PRODUCTION OF FREE-FLOWING, GRANULAR, ATACTIC POLYBUTENE-1

[72] Inventor: Albert Frese, Marl, Germany
[73] Assignee: Chemische Werke Huels Aktiengesellschaft Patentabteilung, Marl, Germany
[22] Filed: Sept. 25, 1970
[21] Appl. No.: 75,735

[30] Foreign Application Priority Data

Sept. 26, 1969 Germany ..................... P 19 48 623.8

[52] U.S. Cl. ................... 260/93.7, 260/94.9 B, 260/94.9 F
[51] Int. Cl. ..................... C08f 1/42, C08f 1/92, C08f 3/12
[58] Field of Search ............................... 260/94.9 F, 93.7

[56] References Cited

UNITED STATES PATENTS

| | | |
|---|---|---|
| 2,983,720 | 5/1961 | Leary et al. ..................... 260/94.9 F |
| 3,001,976 | 9/1961 | Langer, Jr. et al. ............... 260/94.9 F |
| 3,058,971 | 10/1962 | Miller et al. ..................... 260/94.9 F |

FOREIGN PATENTS OR APPLICATIONS

| | | |
|---|---|---|
| 1,147,755 | 4/1963 | Germany ..................... 260/94.9 F |
| 240,472 | 9/1962 | Australia ..................... 260/94.9 F |
| 1,517,256 | 3/1967 | France ..................... 260/94.9 F |
| 1,570,325 | 8/1969 | Germany ..................... 260/94.9 F |

*Primary Examiner*—Joseph L. Schofer
*Assistant Examiner*—A. Holler
*Attorney*—Millen, Raptes & White

[57] ABSTRACT

Free-flowing, granular atactic polybutene-1 is produced by low-pressure polymerizing butene-1 with a mixed titanium or vanadium halide and alkylaluminum catalyst to a solids content of up to 200 g./l. using a liquefied gas as diluent; and thereafter adding an alkanol of one to four carbon atoms to the polymerization mixture in an amount at least 4 times the weight of the polymer under high agitation.

10 Claims, No Drawings

PROCESS FOR THE PRODUCTION OF FREE-FLOWING, GRANULAR, ATACTIC POLYBUTENE-1

BACKGROUND OF THE INVENTION

This invention relates to a process for the production of free-flowing, granular, atactic polybutene-1.

"Atactic polybutene-1" is a polybutene-1, a predominant proportion of which is soluble in boiling diethyl ether. Atactic polybutene-1 is employed, inter alia, as an additive in the production of roofing boards and road surfacing materials, in sealing and grouting compositions, as adhesives and as viscosity-improving agents for mineral oils. Atactic polybutene-1 is obtained as a by-product in the manufacture of isotactic polybutene-1 in the form of blocks or sheet stock of about 25 kg. each, which can be processed or formulated only with difficulty. It is also possible to polymerize butene-1 with Ziegler catalysts of low stereospecificity in hydrocarbons which are liquid under normal conditions to produce essentially atactic polybutene. Even in this case, it is obtained in the form of a coagulated mass.

However, it is desirable to have atactic polybutene-1 available in small-particulate, for example, granular form which can be readily weighed, transported, filled into containers, and processed.

It is therefore an object of this invention to provide a process for the production of free-flowing, particulate atactic polybutene-1. Other objects will be apparent to those skilled in the art to which this invention pertains.

SUMMARY OF THE INVENTION

According to this invention, atactic polybutene-1 can be obtained in free-flowing particulate form by the low-pressure polymerization of butene-1, using as the catalyst a mixture of a chloride of titanium or vanadium and an alkylaluminum compound to a solids content of at most 200 g./l.; and thereafter thoroughly mixing the polymerization mixture with an alkanol of 1 to 4 carbon atoms. Separating and drying polymer yields atactic polybutene-1 in free-flowing, particulate form.

DETAILED DISCUSSION

The butene-1 can be in the form of the pure olefin, or as mixture thereof with one or more other unsaturated hydrocarbons, e.g., butene-2 and isobutene, and/or with saturated hydrocarbons, such as butane, isobutane, or propane. Very useful is, for example, a liquid gas mixture of 52 percent by volume of butene-1, 24 percent by volume of trans-butene-2, 16 percent of cis-butene-2, and 8 percent of butane. The butene-1 content of such mixtures should not be below 30 percent by volume, preferably 50 percent by volume.

The polymerization is conducted in the presence of a liquified gas, preferably one boiling below 4° C. Suitable liquefied gases are, for example, propane, butane and isobutane. Butene-1 itself and butene-2 can also be used. Especially useful are the $C_4$-cuts obtained in petroleum refineries consisting of butene-1, butene-2, and butane. Isobutene-containing cuts can also be employed.

The polymerization is conducted under such conditions of pressure and temperature that the above-mentioned gases are present in liquid form. Polymerization temperatures can range, e.g., between 30° and 150° C., preferably between 50° and 90° C. By increasing the polymerization temperature, the atactic proportion in the polymer can be increased. For example, using an $Al(C_2H_5)_3/TiCl_4$ catalyst, at 35° C., a polybutene is obtained having an ether-soluble proportion of 55 percent; at 50° C., the proportion is 65 percent; and at 90° C., the proportion of ether soluble components is 76 percent. Reaction pressure is usually 3–40 atmospheres gauge, preferably 6–12 atmospheres gauge. When butane is to serve as the liquid gas, a suitable reaction pressure is that produced by the butane and butene at the selected reaction temperature, e.g., 10 atmospheres gauge at 80° C.

The polymerization catalyst is a mixed catalyst of a chloride of titanium and vanadium, e.g., $TiCl_4$, $VCl_4$, and $VOCl_3$, and mixtures thereof and an alkylaluminum, especially trialkylaluminum compounds and dialkylaluminum hydrides, e.g., $Al(C_2H_5)_3$, $Al(C_3H_7)_3$, $Al(C_4H_9)_3$ and $Al(iso-C_4H_9)_2H$, $TiCl_3$, previously reduced with alkylaluminum compounds, especially ethyl aluminum sesquichloride, which $TiCl_3$ is activated with a trialkylaluminum in a molar ratio of Al : Ti >1.5, advantageously can be used. In general, molar ratios of Al : Ti or V of 0.5 : 1 to 10 : 1, preferably 1 : 1 to 2 : 1, are employed. The titanium and vanadium compounds are preferably utilized in a concentration of 1 to 10 millimols/l., based on the total charge. The polymerization preferably is conducted in a kettle equipped with an agitator.

The polymerization is continued until the solids content of the thus-obtained solution or dispersion is at most 200 g./l., preferably about 120 to 180 g./l.

The polymerization mixture is then brought to a temperature of 10°–40° C., preferably 20°–30° C., and an alkanol of 1 to 4 carbon atoms is mixed therewith. At least 4 times by weight, based on the polymer, e.g., 4 to 10 times, preferably 5 to 8 times, of the selected alcohol ordinarily is employed to ensure the production of a particulate product.

Suitable alcohols are ethanol, propanol, isopropanol, butanol, isobutanol, and especially methanol. Higher alcohols have the disadvantage that they are more difficult to remove during the subsequent drying step.

The alcohol and polymer are combined under high agitation. For purposes of effecting an intensive mixing, impeller or propeller stirrers used at their higher speeds of rotation are suitable, for example 200 – 400 r.p.m., in a 40-liter kettle. Other suitable mixing apparatus are sonic stirrers and mixing assemblies which operate according to the rotor-stator principle, such as, for example, Ultra-Turrax stirrers, "Supraton" and "Reaktron" devices.

It is sometimes advantageous after the polymerization to first decompose the polymer suspension, e.g., at 10°–40° C., with a small amount of the alcohol, preferably about 20 percent by weight, based on the total charge, separate the atactic polybutene by filtration or centrifuging, and subsequently mix the polybutene intensively with a larger amount of the alcohol, e.g., 4 to 10 times by weight, based on the polymer.

The alcohol treatment of the polymer can be conducted in one stage. However, it is also possible to separate the polymer after a first alcohol treatment, mix the separated polymer once more with alcohol, and repeat the intensive mixing treatment.

The alcohol treatment is terminated when a well-distributed suspension is obtained. For this purpose, a period of mixing of 10 – 100 minutes is generally required. During the alcohol treatment, the liquified gas is volatilized.

Thereafter, the polymerized product is separated from the alcohol in a conventional manner, for example by means of a decanting centrifuge, a screen centrifuge, a peeler centrifuge, or a suction filter. The separated polymer can be freed of residual alcohol by drying at a temperature not to exceed 60° C., preferably ca. 30° – 40° C. The drying step can be conducted, for example, in a stream – dryer, a drum dryer, a fluidized bed dryer, or a vacuum dryer.

As a result of the above-described treatment, atactic polybutene-1 is obtained of particle size of 0.05 to 1.5 mm. The exact size depends, inter alia, on the intensity of mixing during the alcohol treatment, as well as on the ether-soluble proportion of the polymer. In mixing assemblies operating according to the rotor-stator principle, and in case of poly-butenes having a relatively low ether-soluble proportion, products of smaller granular size are usually obtained.

A thus-produced atactic polybutene-1 with an ether-soluble proportion of below 70 percent is obtained as a pourable powder having a bulk density of about 150 – 220 g./l. Fluidity increases as the ether-soluble proportion of the polymer decreases. In the case of a polymer having an ether-soluble proportion above 70 percent, fluidity decreases to the extent that the highly atactic poly-butene-1 exhibits the characteristics of a viscous fluid. Although the individual grains of polymer do not conglomerate, they adhere to one another to such an extent that the atactic polybutene-1 flows like a viscous fluid. This product can nevertheless be satisfactorily processed and mixed with other components.

In each case, the polymer of this invention is obtainable in a free-flowing, granular condition. However, in order to further improve fluidity, the polymer mixture can be mixed with the alcohol in the presence of, e.g., 0.1 – 50 percent by weight, preferably 1–10 percent by weight, based on the atactic polybutene-1, of a finely divided, solid filler. Suitable fillers are, for example, active silicic acid, carbon black, chalk, lime, aluminum oxide, silicates, finely divided pigments, e.g., titanium dioxide, ultramarine blue, or an essentially crystalline polyolefin, preferably isotactic polybutene. Such fillers further improve the fluidity of the particulate atactic polybutene-1, so that the characteristics of polymers having an ether-soluble proportion of above 70 percent change from a pseudo-viscous, liquid-like condition into that of a free-flowing solid.

Either the polymerization process or the working-up procedure, or both, can be conducted continuously and discontinuously.

The thus-produced atactic polybutene products are suitable for use in the production of roofing boards and road surfacing materials, as sealing, grouting, and insulating compositions, as an additive to adhesives, and as viscosity-improving agents for mineral oils, as an additive to mixtures of washing agents, and also as a binder for coloring concentrates for the pigmentation of polyolefins.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a 40-liter pressurized vessel with an agitator, 12 parts by weight of a $C_4$-cut containing 52 percent of butene-1, 24 percent of transbutene-2, 16 percent of cis-butene-2, and 8% of butane, is polymerized in the presence of 0.015 part by weight of $TiCl_4$ and 0.012 part by weight of $Al(C_2H_5)_3$ at 90° C. and 11 atmospheres gauge. After a polymerization period of 6 hours, the mixture is cooled to 20° C. Under intense agitation, 220 r.p.m., 2.4 parts by weight of methanol are gradually added. After a residence time of one hour, the polymer is separated on a forced suction filter, then mixed intensively for 10 minutes with 15 parts by weight of methanol at 20° C. by means of a "Kotthoff" turbine mixer.

After a second separation at 40° C., the solids are dried under a vacuum. In this manner, 3.2 parts by weight of an essentially atactic polybutene is obtained which is soluble to an extent of 76.2 percent in boiling ether and exhibits a reduced specific viscosity of 0.8 (measured in an 0.3 percent solution in "Decalin" at 135° C.). A coarse-grained powder is obtained, the individual polymer grains of which adhere slightly to one another, so that the product exhibits the behavior of a viscous liquid which is readily processable and mixable.

If the intensive mixing step is conducted with methanol in the presence of 0.1 part by weight of active silicic acid KS 300 (company: Hoesch/Duren), an easily pourable powder is obtained having a bulk density of 208 g./l.

EXAMPLE 2

In a 40-liter pressurized kettle, 12 parts by weight of butene-1 is polymerized under agitation (200 r.p.m) with the aid of 0.008 part by weight of $TiCl_4$, 0.004 part by weight of $VOCl_3$, and 0.01 part by weight of $Al(C_2H_5)_3$ in the presence of 0.002 part by weight of hydrogen at 70° C. and 8.5 atmospheres gauge. After a polymerization period of 5 hours, the mixture is cooled to 25° C. and 2.0 parts by weight of methanol is added under intensive stirring (200 r.p.m.). Thereafter, the thus-obtained suspension is circulated by pumping with a "Supraton" device for 15 minutes. During this time, 12 parts by weight of methanol and 0.2 part by weight of chalk are added. The unreacted butene is simultaneously expanded. After drying at 50° C., 3.3 parts by weight of a free-flowing powder is obtained having a reduced specific viscosity of 0.6.

By the addition of finely divided lime or polybutene-1, readily pourable powders are likewise obtained.

EXAMPLE 3

Into a 500-liter pressurized kettle equipped with a stirrer, there are introduced continuously, per hour, 15 parts by weight of a $C_4$-cut containing 56 percent of butene-1, 21 percent of trans-butene-2, 15 percent of cis-butene-2, and 8 percent of butane; 0.018 part by weight of $TiCl_4$; and 0.015 part by weight of $Al(C_2H_5)_3$ at 80° C. and 10 atmospheres gauge. Using a slide valve which is level-controlled, the suspension is introduced into a second 200-liter, agitator-equipped kettle, which latter is cooled to 20° C. and expanded to about 1 atmosphere absolute. The contents of this kettle are circulated by pumping by means of a "Reaktron" device. Into the inlet part of the "Reaktron" device, a suspension of 0.4 part by weight of titanium dioxide in 20 parts by weight of methanol is continuously added per hour. Using a level-controlled slide valve, the polymer suspension is conducted from the second kettle into a decanter and separated. After drying at 40° C., 4.5 parts by weight per hour of a readily fluid powder is obtained.

If 2.0 parts by weight of titanium dioxide is introduced into the second kettle, in place of 0.4 part by weight, the hourly yield is 6.1 parts by weight of a fluid powder which is very well suitable for use as a dyeing concentrate.

In the same manner, pourable powders or dyeing concentrates can be produced, for example, with carbon black or ultramarine blue.

EXAMPLE 4

In a 40-liter kettle with an impeller agitator, 18 parts by weight of a $C_4$-cut containing 56 percent of butene-1 is polymerized under stirring (200 r.p.m) with the aid of a catalyst, produced from 0.015 part by weight of $TiCl_4$ by reduction with 0.013 part by weight of ethyl aluminum susquichloride at 0° C. and subsequent activation at 20° C. with 0.018 part by weight of $Al(C_2H_5)_3$. The polymerization is conducted at 120° C. After polymerizing time of 5 hours, the mixture is cooled to 30° C. and gradually mixed, under intensive stirring (350 r.p.m.) within one hour, with 25 parts by weight of methanol. At the same time, the residual $C_4$-hydrocarbons are expanded 5,4 parts by weight of a free-flowing powder is obtained, which is soluble in boiling ether to 62 percent and exhibits a reduced specific viscosity of 0.9.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of free-flowing, granular, atactic polybutene-1 by the low-pressure polymerization of butene-1 which comprises the steps of polymerizing the polybutene-1 in a liquified gas at an elevated temperature to a solids content of up to 200 g./l. employing as catalyst a chloride of titanium or vanadium and an alkylaluminum compound; thereafter mixing the polymerization mixture with high agitation with at least 4 times by weight, calculated on the polymer, of an alkanol containing one to four carbon atoms; separating the polymer from the alkanol; and drying the separated polymer at a temperature below 60°C.

2. A process according to claim 1, wherein the alkanol is methanol.

3. A process according to claim 1, wherein the polymerization mixture is mixed with 5 to 8 times by weight, based on the polymer, of the alkanol at a temperature of 10°–40° C.

4. A process according to claim 3, wherein the polymerization mixture is first mixed with a minor proportion of the alkanol and thereafter with the larger volume of alkanol.

5. A process according to claim 1, wherein the polymerization is conducted in a polymerization solvent consisting essentially of at least one $C_4$-hydrocarbon.

6. A process according to claim 5, wherein the solvent is a $C_4$-petroleum cut.

7. A process according to claim 1, the polymerization mixture is mixed with the alkanol in the presence of 0.1 – 50 percent by weight, based on the polymer of a finely divided filler.

8. A process according to claim 1, wherein the polymerization is conducted in a $C_4$-petroleum cut as polymerization solvent; the polymerization mixture is mixed with 5 to 8 times by weight, based on the polymer, of the alkanol at a temperature of 10°–40° C.; and drying the separated polymer at about 30°–40° C.

9. A process according to claim 8 wherein the polymerization mixture is mixed with methanol.

10. A process according to claim 9 wherein the polymerization mixture is mixed with methanol at a temperature of about 20°–30° C.

* * * * *